(12) United States Patent
Rubin

(10) Patent No.: US 9,396,441 B1
(45) Date of Patent: Jul. 19, 2016

(54) MULTILEVEL CONSTRAINT-BASED RANDOMIZATION ADAPTING CASE-BASED LEARNING TO FUSE SENSOR DATA FOR AUTONOMOUS PREDICTIVE ANALYSIS

(71) Applicant: Stuart H. Rubin, San Diego, CA (US)

(72) Inventor: Stuart H. Rubin, San Diego, CA (US)

(73) Assignee: The United States Government as Represented by the Secretary of the Navy, Washington, DC (US)

( * ) Notice: Subject to any disclaimer, the term of this patent is extended or adjusted under 35 U.S.C. 154(b) by 269 days.

(21) Appl. No.: 14/041,902

(22) Filed: Sep. 30, 2013

(51) Int. Cl.
*G06F 17/00* (2006.01)
*G06N 99/00* (2010.01)

(52) U.S. Cl.
CPC .................. *G06N 99/005* (2013.01)

(58) Field of Classification Search
CPC ........................................................ G06N 5/00
USPC ...................................................... 706/12, 45
See application file for complete search history.

(56) References Cited

U.S. PATENT DOCUMENTS

| | | | |
|---|---|---|---|
| 6,571,251 B1 * | 5/2003 | Koski | G06N 5/04 |
| 7,047,226 B2 | 5/2006 | Rubin | |
| 8,073,804 B1 | 12/2011 | Rubin | |
| 8,117,147 B1 | 2/2012 | Rubin | |
| 8,250,022 B1 | 8/2012 | Rubin | |
| 2002/0019870 A1 * | 2/2002 | Chirashnya | H04L 41/0681 709/224 |
| 2014/0247140 A1 * | 9/2014 | Proud | A61B 5/0022 340/870.02 |

OTHER PUBLICATIONS

Kiperstock, et al., Evidence based Bayesian Networks Approach to Airplane Maintenance, 2002, IEEE. pp. 1-5.*
Rubin, Stuart et al., KASER: Knowledge Amplification by Structured Expert Randomization IEEE Trans. Syst., Man, Cybern., vol. 34, No. 6, Dec. 2004, pp. 2317-2329.
Rubin, Stuart, On Randomization and Discovery, J. Information Sciences, vol. 177, No. 1, 2001, pp. 170-191.

* cited by examiner

*Primary Examiner* — David Vincent
(74) *Attorney, Agent, or Firm* — Spawar Systems Center Pacific; Kyle Eppele; Susanna J. Torke

(57) ABSTRACT

The invention is a method and system updating the automated responses of an autonomous system using sensor data from heterogeneous sources. An array of cases representing known situations are stored as data structures in a non-transitory memory. Each case in the array of cases is associated with an action to create a database of identifiable situation-action pairs. The system determines an acceptable range of correctness of partial matches of sensed data for new cases to the data properties of known cases and creates and overwrites now situation-action pairs in a process of autonomous learning of new responses.

5 Claims, 3 Drawing Sheets

MULTILEVEL CONSTRAINT-BASED RANDOMIZATION ADAPTING CASE-BASED LEARNING TO FUSE SENSOR DATA FOR AUTONOMOUS PREDICTIVE ANALYSIS

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: sscpac_t2@navy.mil. Reference Navy Case No. 101614.

BACKGROUND

1. Technical Field

The present subject matter presents a novel system for autonomous predictive analysis using data from multiple fused sensor inputs stored in non-transitory computer memory.

2. Related Art

Sensors and the means of information systems to communicate are well-known. Known sensors and communication systems require ever-more bandwidth to provide end-users with a real-time scenario understanding or "situational awareness." Better situational awareness is created by an amalgamation of sensor inputs. If current communication bandwidth limitations can be mitigated, end-users can attain synchronized, high-speed analysis and decision-making.

Ever-increasing bandwidth does not efficiently resolve every problem related to large quantities of data from diverse sources of data, each of which generate a different type of data. For example, increased bandwidth cannot autonomously fuse diverse information inputs, use the diverse information for near real-time decision-making, and then acquire an ever-greater expertise to do so from observing an end-user's behavior. This means for acquiring, digesting, delivering, and updating, the information intended for end-users is referred to in the art as "machine-learning."

Forms of machine learning are known in the art. Heuristic solutions have been used for mission planning. These approaches and algorithms are referred to in the art as "agent-based," or "rule-based."

A limitation of rule-based systems known in the art is that they cannot simulate a human decision maker's thought process. Human analysts must ultimately interpret and manipulate data to move the data up the authoritative hierarchy. Information must be synthesized in a decision maker's head since sensors can only gather data without any predictive capabilities. Agent-based systems can only make decisions based upon immediately gathered data in relation to set rules.

"Fuzzy" inference is a term known in the art for heuristically processing data when an exact case match is not possible. Heuristic systems are known in the art that perform such processes, however, these systems are not yet capable of making complex associations between gathered data and inferential results.

There is an unmet need for computer systems, including autonomous vehicle systems, capable of making associations necessary to filter extraneous data input and minimize demands on human resources and communication.

There is a further unmet need that intelligence and data gathering systems be able to learn from patterns of gathered data and to more closely approximate human decisions, reducing the need for human interaction.

SUMMARY OF THE INVENTION

The present subject matter is directed to a case-based learning system for fusing heterogeneous data obtained from multiple sensors. This data is stored in non-transitory memory component and used in predictive analysis using one or more data structures containing data representing cases. Each reflects situation parameters and actions taken, represented as situation-action token pair. Each situation may comprise a range or set of parameters, and the action token is a software object that is associated with a particular situation or set of responses including software functions.

The case-based learning system receives situation parameters comprised of either sensor data or a fed-back case. The system further includes a processor (hardware component) configured to perform the steps of comparing the received situation parameters against an array of cases that is stored in a non-transitory case base memory. The processor determines whether the received situation parameters are a non-deterministic case for which there is not enough data on which to base a further action. Once enough information is received for a particular case, processing components perform the steps of determining a best-matching case from the array of cases. The best-matching case is a case in the array of cases having a corresponding situation-action token pair with the highest-calculated possibility of being matched by the received situation parameters. A best action token is generated, which is subject to further error checking and a squelch test algorithm. If the best-action token satisfies the minimum squelch threshold, then the system is further configured to output the situation-action token pair of the best-matching case to a non-transitory buffer memory.

The system may be further configured to expunge a least-recently triggered case from the array of cases, and place the new case at the beginning of the array of cases. In addition, system may be further configured to perform the step of sending the new case to the processor as a fed-back case.

DETAILED DESCRIPTION

Exemplary Method Embodiment

Figure 1:
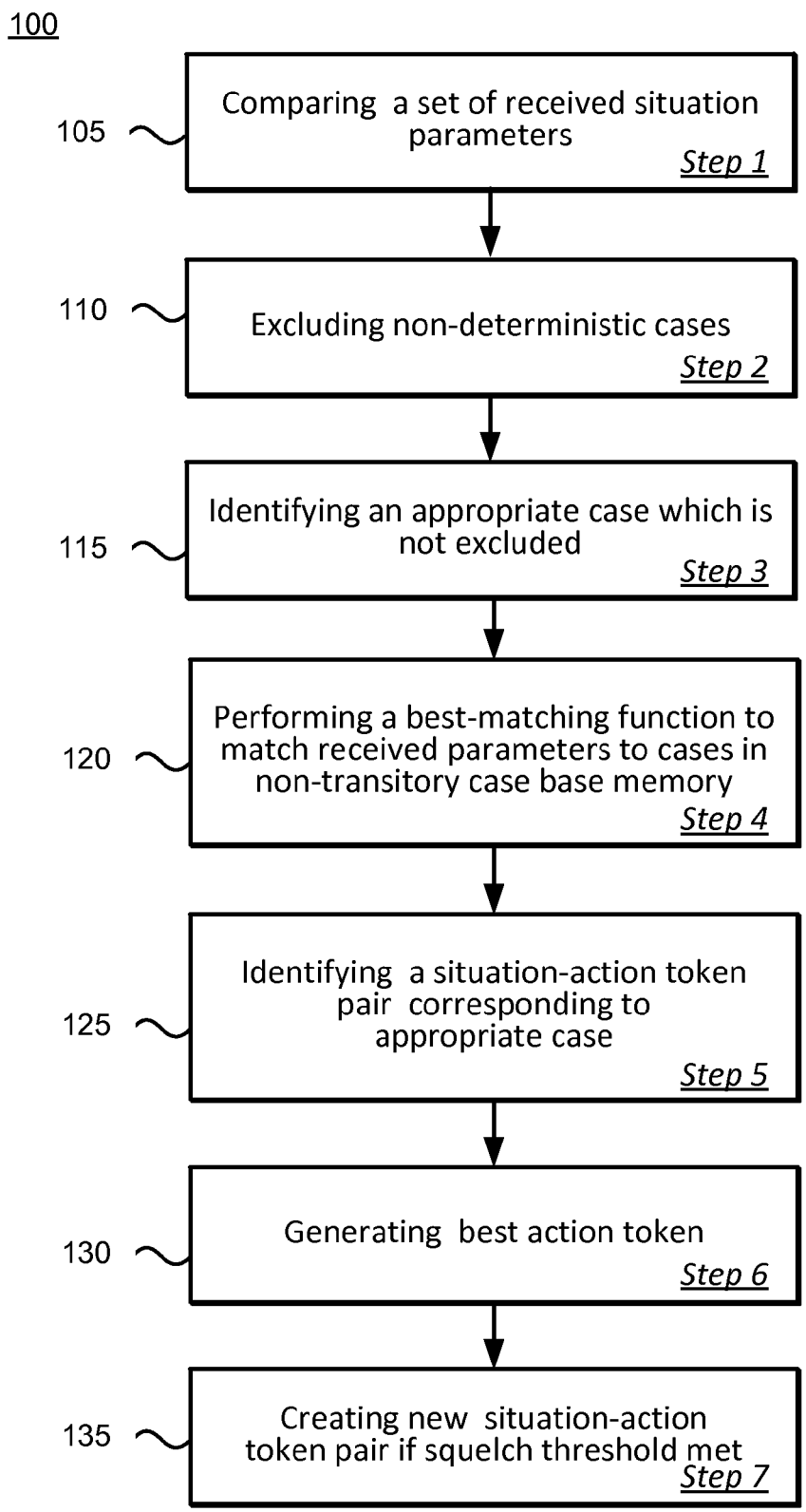
FIG. 1 is a flow chart of an exemplary method for autonomous predictive analysis.

FIG. 1 illustrates an exemplary embodiment of method 100 for implementing case based learning to fuse sensor data for predictive analysis.

In the exemplary method shown, Step 1, 105, is the step of comparing the received situation parameters against an array of cases that is stored in a non-transitory buffer memory. The received situation parameters may be any sensor data from any source which is stored in transitory system memory.

Step 2, 110, is the step of excluding non-deterministic data cases based on comparing the received parameters to known cases. A non-deterministic case is one which cannot be matched in a manner so as to include random chance, and is thus not a sufficient match on which to base a further action.

If the received situation parameters is a non-deterministic case, then the processor is configured to send the received situation parameters to a processing component (referred to as a "new case generator") which iteratively repeats a best-matching function by continuing to match the properties of the received situation parameters to an appropriate case.

Step 3, 115, is the step of identifying a new situation case for which enough sensed information is received so that the situation parameters are no longer non-deterministic.

Step 4, 120, is the step of determining a best-matching case from the array of cases, wherein the best-matching case is a case in the array of cases which is most similar to the new situation case defined by the received parameters.

In Step 5, 125, is the step of identifying a corresponding situation-action token pair.

The corresponding situation-action pair has the highest-calculated possibility of being matched by the received situation parameters.

In Step 6, 130, a best-action token is generated corresponding to the action data in situation-action token pair of the determined best-matching case.

Various embodiments may include error checking steps. If the best action token is incorrect, then the processor is further configured to send the received situation parameters to the new case generator and overwrite the incorrect best-matching case in the array with the new case.

Step 7, 135, is the step of creating a new situation-action pair after determining whether the best action token satisfies a minimum squelch threshold. In the exemplary embodiment shown, if the best action token fails to satisfy the minimum squelch threshold, then the processor is configured to send the received situation parameters to the new case generator. If the best action token satisfies the minimum squelch threshold, then the system is further configured to output the situation-action token pair of the best-matching case to a non-transitory buffer memory.

In various embodiments, a processor, herein referred to as a "new case generator" of the system is configured to perform the step of generating a situation-action token pair for a new case that is not within the parameters defined by the system. In various embodiments, the new case generator may be configured to perform the step of determining whether the new case is a non-deterministic new case that has a situation set or range overlapping an alternative case in the array. In various embodiments, if a new case is a non-deterministic new case, the system may be configured to overwrite the situation of the alternative case with the situation of the new case.

The new case generator may be further configured to perform the step of expunging a least-recently triggered ("LRT") case from the array of cases, and placing the new case at the beginning of the array of cases. In addition, the new case generator may further configured to perform the step of sending the new case to the processor as a fed-back case which is treated and processed in a substantially similar matter as sensed data.

Exemplary System Embodiment

Figure 2:
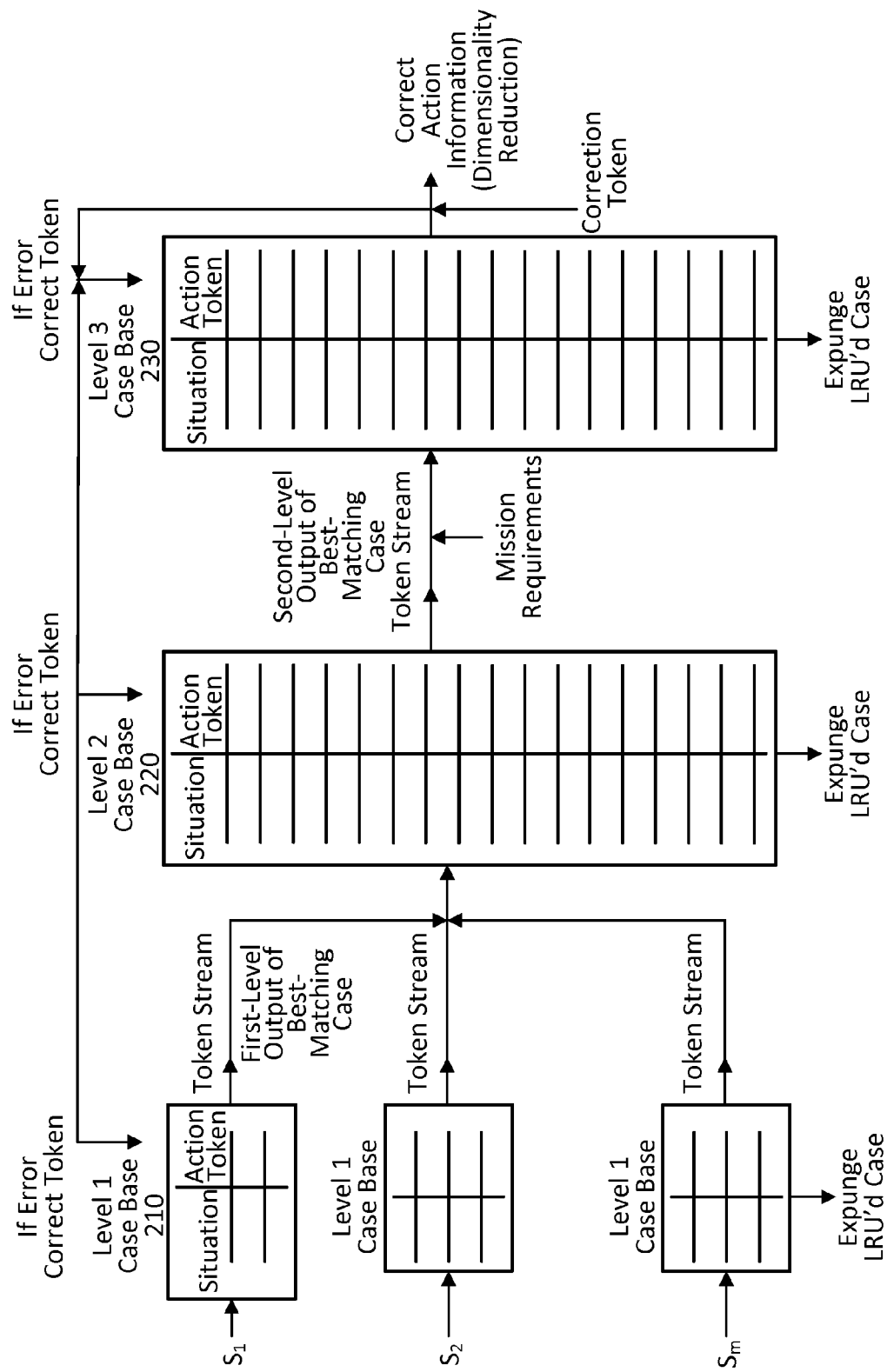
FIG. 2 is a diagram of a system for performing based learning using fuse sensor data to facilitate autonomous decision making.

FIG. 2 is system diagram depicting an exemplary embodiment of a system for implementing case based learning on fused data. The non-limiting system embodiment depicted in FIG. 1 illustrates the interaction of various processing components in an exemplary three level "System of Systems" hierarchy. Here, data collected from various instruments is stored and processed locally. The various instruments include, without limitation, sensors, unmanned devices, etc. Using logical parameters, a local sensor or processing component determines whether the data should be discarded or is appropriately passed on to the second-level for further processing.

In various embodiments, examples of non-transitory storage media include buffer memory, memory, hard drives, thumb drives, disk drives, cloud-drives, and combinations thereof. However, these storage media are not limited to those described in the non-limiting embodiment and the subject matter described herein has a transformative and/or manipulative effect upon these storage media, and the effects are more than transitory in nature.

In the exemplary embodiment shown in FIG. 2, data that satisfies the test parameters of the sensor (first level, 210 is then minimized using dimensionality-reduction algorithm known in the art. The resulting data is then passed on to the second-level, 220. In the second-level, data is received from a variety of instruments that collect heterogeneous data-types, thus supplying the second-level with a heterogeneous set of data. The heterogeneous set of data can include, without limitation, satellites for topographical-imaging, microphones for sound, thermometers for temperature, unmanned aerial vehicles (UAV) for local imaging, etc. The second-level fuses this data according to parameter requirements, measures whether the data should be passed forward to the third-level, 230, and corrects the test parameters for the second-level and the first-level. The third-level again fuses heterogeneous data reported from the second-level sources, performs another error-detection/correction, and then outputs a finalized predictive analysis or decision that falls within the specific requirements using data collected from various sources, whether automated or not.

Raw sensor information is voluminous and thus unnecessarily detailed. Superfluous excess data impedes analysis. For example, it may be desirable to guide a UAV's onboard camera such that the camera only sends back specific frames of interest, then all sensor data needs to be fused and interpreted in situ so as to most efficiently guide the onboard tracking mechanism. In contrast, it would be extremely inefficient and time consuming to send gigabytes of real-time imagery back to operators.

In the exemplary embodiment shown, sensor data dimensionality is reduced to facilitate efficient data transmission over limited bandwidth. This reduction in dimensionality can facilitate prioritization of intelligence needs as well as identification of intent and objectives In various embodiments, intent and objectives can be symbolically represented as values. Non-limiting examples of intelligent systems include expert systems, case-based reasoning, and reference tables.

In the exemplary embodiment shown, fusing sensor data and mission requirements with previous empirical results in the context of a three-level case-based predictive system allows for in-situ processing of high-throughput data so as to filter out data that is of relatively little significance, while simultaneously issuing alerts upon the receipt of significant data. The presently disclosed "System of Systems" constantly adapts and improves performance on these tasks through the use of supervised learning.

As illustrated by FIG. 2, reduction of sensor data requires domain-specific knowledge because each sensor and each specific requirement may be unique. The sum of the knowledge provided by multiple sensors, taken individually, is less than the knowledge provided by the proper fusion of those sensors. This is referred to as "the triangle inequality." Thus, the lowest-level of a system embodiment fuses an arbitrary number of sensors, each providing asynchronous data, and associate a proper predictive, or "action token," with each moving subsequence, or "parameters."

In various embodiments, various types of sensed data may be automatically or autonomously converted into a stream of symbolic descriptors. If a similar subsequence of symbolic descriptors occurs, the same action token is output. The qualitatively "closest match" for the symbolic descriptors corresponding to the received parameters is the proper action token. This is termed a qualitatively "fuzzy" match. As long as there is some commonality between the previously acquired case and the current sensor sample, then there is a significant chance that this fuzzy match will yield the proper predictive action token. However, levels of certainty can vary, and the system can autonomously set a threshold requirement for certainty, called "squelches," whereby if a certain degree of qualitative match is not achieved, the case base will not be permitted to output the best-matched token. Each sensor is thus assured to produce a statistically reliable prediction to any desired level of certainty. Furthermore, if an output is deemed to be incorrect, then the fired case is overwritten with the correct action token, since this is a deterministic system. However, if the best-matched case was squelched, then the action token is used to create a new case to correct the error.

In the first-level case base illustrated in FIG. 2, each sensor is allocated a first-level case array comprising first-level cases. A first-level case is comprised of a single moving subsequence, or "situation," and an associated action token, forming a "situation-action token pair". The case situation is the test parameter (x-variable) for determining whether the associated action token (y-variable) is the appropriate output.

In this example, "length" of the subsequence and the "length" of the array are just long enough so that the space of situational permutations slightly exceeds the pre-allocated number of situations that can be stored in the case array. The size of this array depends on dataflow and parallel processing rates.

New cases are formed (as detailed below) whenever the best-matching case receives feedback that it has less than the best associated action token. The LRT case is expunged from the particular array to make room for the next case acquisition, as necessary.

The output of each first-level case base is stored in a buffer, either locally or at any remote data-storage locale; the output is later received by the second-level case base. The first-level output is then mapped to a single second-level case array.

In the second-level case base, a remote system is allocated a second-level case array comprising second-level cases. A second-level case is similar to that of a first-level case, except that a situation comprises buffered icons arriving at approximately the same time, that is, the buffered icons arrive in parallel instead of in sequence. The length of a second-level array just exceeds the number of situational permutations that can be stored in the array. Cases are processed using parallel processors.

The second-level case base effectively fuses the sequence of received action tokens from the first-level case bases. Accordingly, the situations in a second-level array comprise fused first-level array situations. Moreover, second-level situations further comprise mission requirements token, which tags situations falling within a set of specific requirements. In the second-level case, situations are tested for precision and accuracy, as well as particular relevance. The second-level output-tokens produced thus yield relevant and desired intelligence (decision support) information.

The output of the second-level case base is a sequence of tokens, which are stored in a local or remote storage buffer. The second-level output is then similarly mapped to a third-level case base to produce defining actions.

Concepts that are common to each level are set the same way in each level, that is, to the same output token produced/received at the highest level. Heterogeneous concepts are therefore properly fused. FIG. 2 shows the described multi-level case-based associative memory arrays (first-level array, 210, second-level array, 220, third-level array, 230).

In the embodiment of FIG. 2, feedback loops facilitate auto-associative conceptual recognition. In other words, the feedback loops cause the system's devices to fall into conceptual "wells." As a practical non-limiting example of a conceptual well, humans can auto-associate a familiar object that is partially-obscured, thus tricking the brain into "seeing" the object as a "whole."

The use of quantitatively and qualitatively "fuzzy" case-matching techniques, combined with a corrective feedback mechanism, allows the present "System of Systems" embodiment to acquire fuzzy concepts—thus minimizing the need for transmission bandwidth and associated human analysts. The automated feature extraction helps mitigate the need for more human analysts.

In the present system, embodiments facilitate learning quantitatively and qualitatively fuzzy extensions of previously-acquired data. The learned data helps hone previously-acquired data by creating or amending cases for logical testing.

A case array (or "case base") is a domain-specific (expected parameter data) symbolic record comprising a finite number ("length") of non-redundant ("deterministic") symbolic situation-action token pairs. When a new case is generated, the new situation-action token pairs are acquired at the logical head/front/beginning of the array; pairs at the logical tail, which are the LRT cases, or are expunged to free space, as needed.

A new case is not formed if a putative new case would generate a "non-deterministic" case. A non-deterministic case is a case in which identical situations can imply the output of more than one distinct action token. Non-deterministic cases are not permitted because the non-deterministic cases would needlessly take up space without providing any benefit; it is, therefore, an action of the present subject matter to overwrite an associated action token or amend the situation parameters of the triggered cases.

Triggered cases are also moved to the logical head of their case array. This logical rearrangement helps eliminate the chance of expunging a recently triggered case and reduces access time for array searching/comparisons by creating temporal locality.

Sensor data may be symbolic. Non-limiting examples of symbolic sensor data include Boolean data (true/false) or qualitative descriptors for data such as "warm" or "cold" descriptions for temperature. Sensor data may also be numeric. A non-limiting example of numeric sensor data might include the pulse-repetition rate of a detected radar signal. Sensor data that is mixed-mode data can be broken into distinct data streams. In the present non-limiting embodiment, all data is converted into symbolic data.

Conversion of numeric data into symbolic data requires knowledge of the domain (or, the expected data type for the situation parameters); this includes numeric ranges. Each word or token represents a symbolic descriptor. If too few descriptors are used for the domain, then the case base will not be adequately responsive. Conversely, if too many descriptors are used for the domain, then the case base will be slower to learn and require excessive memory.

As an example of this data conversion, a temperature sensor might be calibrated for human comfort (a qualitative assessment). This calibration might be calibrated through a table lookup of intervals such as (, 32° F.]="cold"; (32° F., 60° F.]="cool"; (60° F., 80° F.]="normal"; (80° F., 90° F.]="warm"; and, (90° F.), ="hot". While some domains, like human comfort level, can be adequately guessed, other domains of interest cannot, and their symbolic translations must be automatically acquired.

The system embodiment makes automatic acquisition of symbolic descriptors possible by utilizing the "Principle of Continuity," which can be concisely stated as follows: if two distinct numeric values (situation parameter ranges) are associated with the same action token such that no distinct action token is known to occur within the common range, then the two values (situation parameter ranges) comprise a (fused) situation parameter range to associate with the action token. Conversely, if two distinct numeric values (situation parameter ranges) are associated with distinct action tokens, then no single situation parameter range may incorporate them both.

As a non-limiting example, if a case in the array holds that 61° F. and 90° F. are "normal" temperatures, then the case has a situation-action token pair for (60° F., 90° F.]="normal". Suppose that a new case is acquired where 81° F.="warm". Then, the previous range is broken in two flanking ranges; namely, (60° F., 80° F.]="normal" and (81° F., 90° F.]="normal" with a singularity of 81° F.="warm". However, if it is next acquired that 90° F.="warm", then this singularity ("warm") is fused with the upper bound of the normal interval to properly redefine (80° F., 90° F.]="warm". It is straightforward to run this process in the reverse direction.

Singularities are not automatically fused to make an interval because, for many domains, there is no logical justification. For example, an individual may transmit on specific frequencies, but the continuity (interpolation) assumption does not necessarily hold here if transmission frequencies are crystal controlled. Thus, this process of interval formation will be enabled for some sensors (e.g., signal amplitudes, pulse widths, etc.) and disabled for others (e.g., signal frequencies, pulse repetition rates, etc.).

The appropriate action token is provided by implementing feedback loops (FIG. 1). However, as a consequence of this "System of Systems" being deterministic, an outputted action token, or sequence of tokens, may incidentally overwrite correct tokens at all levels. Alternatively, if the best-matched case was squelched (as discussed below), then the action token is used to create a new case to correct the error as a fed-back case. This can result in a previous correct association being broken at any level, which occurs from time-to-time. However, using multiple levels and fuzzy matching (discussed below) provides the present "System of Systems" a necessarily limited capability to self-correct for this occurrence. Information fusion can be self-correcting.

A system embodiment, such as the present system, also addresses the effective size for the moving sensor subsequence (array length) to produce a reliable situation so as to yield a reliable action token output (subject to the aforementioned self-correcting mechanism by the time it reaches the output of the third level). If a sampled situation is too short, then too few states will be distinguishable; whereas, if a sampled situation is too long, then the system will slow and require excessive memory and training.

In general, the greater the number of sensors, the shorter their sampled situations may be due to their eventual fusion. One approach, already mentioned, is to base the length of the sensor sequence on the available memory and processor speed. Another approach is to run the sensor to produce actual data streams and partition the stream whenever its interpretation changes. An easily-defined program can be run on all of these partitions to find the maximal-length common-subsequence among all partitions having a distinct interpretation (associated action token). Adding at least one (1) to this maximum length defines how long a moving sensor subsequence needs to be for the particular sensor. This also defines the minimal complexity of single-sensor outputs required for action token discrimination.

However, this computed sensor subsequence is actually considerably longer than necessary on account of numerous sensors being fused at the second level. Mathematically, the inclusion of fed-back cases implies that no formalism exists for computing the optimal sensor length. Rather each case base is designed for available local memory and parallel processors. Then, if a deterministic case action token overwrites an existing case pair within a defined time period, the sensor subsequence length is increased by one (1) for all incoming new situations. This increase in length decreases the likelihood of prompting a non-deterministic overwrite. However, if a non-deterministic overwrite occurs outside of a defined time period, the length of the sensor subsequence is decreased by one (1) for all incoming new situations. This increases the likelihood of prompting a non-deterministic overwrite.

A moderating multiplicative factor may be used to slow these changes down (or even speed them up) as appropriate. The time period is set long enough to minimize the chance of producing erroneous action tokens and short enough to enable the system to operate fast enough and within available memory constraints. Again, sensor inputs are buffered. This adaptive methodology provides for dynamic plasticity in that the system adapts to the complexity of its most-recent environment (i.e., within processor limits).

The embodiment illustrated determines the best-matching case that satisfies received parameters at each level. The best-matching case is determined by calculating the case in the case array with the highest-possibility of being inaccurate. The determination of the best-matching case utilizes a quick set-based error calculation for finding the best-matching case.

"Qualitative inference" refers to a fuzzy technique for finding the maximally-covered case situation (expected parameters) for a given "context," (received parameters) which may or may not be fully covered. In some embodiments, systems can ask questions to collect information and intelligence from, a non-limiting example being modular web services to supply critical missing situational predicates for a context. Once a closest match is found, the computed possibility of error (i) may be reported.

The relative possibility for a particular action with regard to a given context is defined by:

$$\text{possibility } (i) = \frac{|\text{context} \cap \text{situation}_i|}{|\text{context} \cup \text{situation}_i|}, \quad \text{Equation (1)}$$

where possibility (i) $\Sigma[0,1]$, and temporal locality in the array is used to break ties (where the logically highest-matching situation, in a particular case array, is deemed to best match the context). A case must have greater than a zero possibility and be above squelch to be applied.

The purpose of the squelches is to minimize the occurrence of guessing on the part of the system—so that the system will converge on knowing when it knows, or does not know, the proper associated action. The proper setting for the squelch is domain specific, which means that each case base will have its own squelch, which is initialized to a possibility of 0.5. If the best-matching case is below squelch, then a request for the correct token is issued to the external system (FIG. 1). For each case base, whenever an incorrect action is produced at the third or highest level, the squelches for each case base are raised by:

$$\text{squelch} \leftarrow (\text{squelch}+1)/2 \qquad \text{Equation (2)}.$$

Similarly, for each case base, whenever a correct, but "squelched" action is produced at the third or highest level, the squelches are reduced by:

$$\text{squelch} \leftarrow \text{squelch}/2 \qquad \text{Equation (3)}.$$

The best-match possibility is a metric for the reliability of the action produced by a given context. Squelched possibilities have a default possibility of zero (i.e., not operational) until the correct action token arrives, whereupon the possibility computes to 1 with the acquisition of the new case.

Where relevant in certain embodiments, the possibility for parallel output token streams is the minimum of their individual possibilities, where possibilities of 0, or squelched action tokens, are excluded from the computation of the next context. Excluding the outputs of case bases below squelch insures that the fusion technique will utilize only "informed votes" for the output(s) at each level.

The possibility for the output of a sequence of case base levels is the product of the output possibilities at each level (FIG. 1). Possibilities can be experientially linked to likelihoods as shown in Table 1.

TABLE 1

Possibilities (P) Linked to Likelihoods

| Lower P | Upper P | Likelihood |
|---------|---------|------------|
| 1.00 | 1.00 | Certain |
| 0.76 | 0.99 | Very Likely |
| 0.51 | 0.75 | Likely |
| 0.26 | 0.50 | Unlikely |
| 0.01 | 0.25 | Very Unlikely |
| 0.00 | 0.00 | Impossible |

The situations of the second-level case bases are created from the concatenation (in parallel) of the action tokens output from the first level case bases, but is otherwise exactly the same in operation as the first level; for example, acquiring distinct cases at the logical head and expunging LRT cases from the logical tail. However, the action token inputs that are received by the second level arrive asynchronously.

Asynchronous processing is possible because the possibility equations (1) and (4), effectively remove the requirement to wait for all tokens to arrive. Rather, it will usually be sufficient for a majority of tokens to arrive to effectively match a proper situation in real time (as previously described). In the second level, improper partial matches are corrected by learning feedback, which therefore adjusts for any tendency to temporally recur. Thus, embodiments are capable to compute in the absence of perfect information.

Some of the action tokens received by the second-level may be below squelch—thus receiving a calculated possibility equivalent to a possibility of 0. The result is excluding the action tokens received by the second-level from participating in the second-level context computation for best-match.

The number of sensor-driven case bases at the first level needs to be sufficient for the number of output action tokens produced at the second level. If there are too many, the system will be unnecessarily slowed down and require excessive memory. If there are too few, the second-level system will engage in thrashing, since its deterministic tokens will necessarily be frequently overwritten due to the lack of specificity in the associated situations supplied.

If a non-deterministic overwrite occurs in the second level and within a defined time period, the number of token inputs received increases by one times the number of first-level case bases, for all incoming new situations—decreasing the likelihood of a deterministic token overwrite. However, if a non-deterministic overwrite occurs outside of a defined time period, the length of the sensor subsequence is decreased by one times the number of first-level case bases, for all incoming new situations—increasing the likelihood of a deterministic token overwrite.

A moderating multiplicative factor may be used to slow these changes down (or even speed them up) as appropriate. The time period is set long enough to minimize the chance of producing erroneous action tokens and short enough to enable the system to operate fast enough and within available memory constraints. The tokens output by the first-level case bases are buffered during the wait intervals.

The third-level case base has asynchronous tokens arriving from the output of the second-level case base along with tokens representing the mission requirement. It is otherwise similar in its operation to the description for the previous two levels (namely, acquiring distinct cases at the logical lead and expunging the LRT cases from the logical tail). Action tokens not tagged with mission requirement tokens may be squelched—an equivalent to having a possibility of 0, which excludes them from the third-level context. The third-level system polls the mission requirement tokens—even if there is no change—as no computation may be performed in without mission requirement tokens at the third level.

As a practical matter, it is possible to have multiple third-level case bases, where each resides on a different parallel processor and each is specific to a distinct mission requirement. This will result in a linear speedup of the computation by distributing the load. This approach presumes that the number of mission requirements does not exceed the number of processors assigned to the third level. It will work well if the set of mission requirements is relatively static.

Otherwise, if the mission requirements cannot be distributed over parallel processors, then it is insured that no case will be matched at the third level unless its situation contains an exact match for the latest mission requirement. Equation 4 modifies Equation 1 to satisfy this stipulation:

$$\text{possibility}(i) = \begin{cases} \dfrac{|\text{context} \cap \text{situation}_i|}{|\text{context} \cup \text{situation}_i|}, \\ \quad \text{if mission requirement} \in \text{situation}_i \\ 0, \text{ otherwise} \end{cases} \qquad \text{Equation (4)}$$

The number of tokens output by the second-level case base and fused with the most recent mission requirement token is increased by one if a non-deterministic overwrite occurs within a defined time period for all new situations coming in—decreasing the likelihood of a deterministic token overwrite. However, if a deterministic token overwrite would occur outside of a defined time period, decrease the length of the second-level subsequence output by one for all incoming new situations—increasing the likelihood of a deterministic token overwrite.

Again, a moderating multiplicative factor may be used to slow these changes down (or even speed them up) as appropriate. The time period is set long enough to minimize the chance of producing erroneous action tokens and short enough to enable the system to operate fast enough and within available memory constraints. The action tokens output by the second-level case base are buffered. The use of possibility Equations 1 or 4, as appropriate, effectively removes the requirement to wait for all tokens (other than the mission requirement) to arrive—enabling qualitatively fuzzy case retrieval without perfect data. Erroneous and squelched outputs are corrected using learning feedback loops (FIG. 1) via fed-back cases.

Corrected action tokens, and associated situations where actions are squelched, are supplied to correct the output of each case base at all levels (FIG. 1). This event occurs asynchronously whenever it is determined that the system outputs an erroneous or less than perfect decision, or whenever any decision output is squelched at the third level and a proper action token can be assigned. Asynchronous communication makes use of a handshake or dataflow architecture. Possibilities produced at the third level may be output as likelihoods (Table 1).

Certain embodiments of the disclosed subject matter are systems that practice the disclose subject matter. These embodiments practice the disclosed subject matter utilizing structural features. Some embodiments of a system are a "System of Systems."

Sensor data is converted into symbolic points or interval ranges. Processors fuse this data in parallel, while the results of fusion need to be interpreted in sequence over time and further combined with the mission requirement (or even the output of other systems) to arrive at a predicted action for supplying decision support.

A sequence of computers process three levels of case bases having logical ordering and garbage collection are used to fuse the sensor inputs and translate them into actions consistent with the mission requirement. At each level of case base, the computers calculate possibilities and squelched tokens to insure that any action output will not be spurious. Possibility squelches and the length of the context produced at each level are dynamically and automatically optimized to maximize the quality of the output, while minimizing the time and space it takes to compute them. The use of possibilities allows for the qualitatively fuzzy matching of the context with the situations at each level.

In some cases, associated databases may be automatically queried in an attempt to retrieve critical missing information. As a result, the system can dynamically adapt to the use of less than perfect sensor information in rendering decisions. Learning feedback to correct erroneous outputs—including squelched outputs—occurs asynchronously and is realized through the use of handshake or dataflow architectures.

Multiple and heterogeneous sensor streams are received from multiple sensors, arriving in real time, and being used to recommend actions that are consistent with the mission requirement. The system overall improves its performance through the use of supervised learning at each level computer processor, and provides certainty for each computed recommendation by suppressing squelched possibilities. Action tokens satisfy overarching strategic mission requirements by prioritizing intelligence needs derived from a mission requirements database while also simultaneously best serving the tactical mission objectives as directly acquired from the supplied mission requirement (also from the mission requirements database) and indirectly through multilevel feedback.

Embodiments of the system can be linearly sped up with single instruction, multiple data (SIMD) parallel processors to facilitate complex, real-time decisions, which would involve the fusion of many sensors and the production of numerous alternative action tokens at the output of the third-level case base.

Exemplary Autonomous Vehicle System Embodiment

Figure 3:
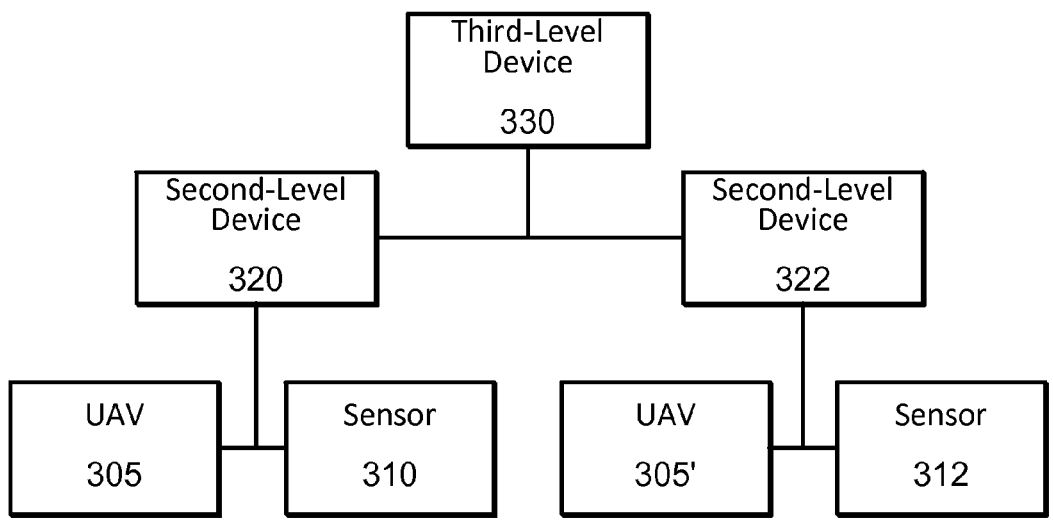
FIG. 3 illustrates an exemplary embodiment of a system for implementing case based learning for an unmanned vehicle.

FIG. 3 illustrates an exemplary embodiment of a system 300 for case based learning for an unmanned vehicle, which in the embodiment shown is an unmanned aerial vehicle (UAV).

In exemplary embodiment shown, UAVs 305, 305' constitute the lowest level of a multi-tiered "System of Systems." While the present embodiment discusses a three-tiered system, a person having ordinary skill in the art will appreciate that more, or fewer, tiers could be implemented to practice the present subject matter. In addition, a person having skill in the art will recognize that, in the above discussion and following discussion, the use of the terms "sensor" and the term "UAV sensor" are used interchangeably and mean the same thing. The term "UAV sensor" can refer to the UAV as a sensor itself, or the term can refer to a sensor located on the UAV.

Furthermore, the below description can apply to a single UAV 305 or 305' in which the present subject matter is incorporated into the circuitry of the UAV and the algorithm is carried out by the UAV. However, other embodiments of the present subject matter contemplate a plurality of UAV's, each UAV including communication equipment to allow the UAV's to communicate with a base or computer. In such an embodiment, the base or computer receives the sensor data or the UAV sensor data and executes the subject matter. As further explained herein, whether the present subject matter is executed by the UAV (or plurality of UAV's) or by the base or computer, the hierarchical structure of the "Systems of Systems" is deployable, allowing the various components to learn and provide more concise data to the end user. It is contemplated that, no matter the embodiment herein, the data may ultimately be outputted to a user or operator.

In this non-limiting embodiment, multiple UAVs 305, 305' have diverse types of sensors 310, 312, respectively, which gather diverse types of information. A person having ordinary skill in the art will appreciate that the UAVs described herein could constitute any type of robotic device capable of collecting data. The UAVs 305, 305' employed in embodiments of the UAV system 300 are not limited to aircraft, seaborne, terrestrial, or spacecraft. The UAVs are also not limited to those being mobile or immobile.

At the first level, the UAVs have a case-base, or "array of cases." These cases are a "situation" and an "action token" pairing. In the array, the situation comprises a range of parameters, or a set of parameters. Also in the array, the action token is particular software object that is associated with a particular situation.

A UAV's onboard sensor 310, 312 collects the types of data for which it is intended to gather, including, but not limited to, images, climate data, audio, etc. This data is then temporarily stored in an onboard memory bank. This gathered sensor data, or "received situation parameters," is compared against the UAV's stored array of cases. By conducting this comparison, the UAV determines whether the received situation parameters meet certain criterion for elevating the received situation parameters to a second-level device for further processing.

Before conducting the actual calculation, the UAV processor determines whether the received situation parameters are a deterministic case. In other words, the UAV processor determines whether the data is found within one or more situations in the array, or put another way, whether the data corresponds to more than one action token. Cases should be deterministic, both when formed and as they are represented by the array. Thus, if information is received such that more than one case is satisfied, then either the existing case, or the received situation parameters, is not deterministic.

Whether a case is deterministic is also a question of whether there are clear boundaries between each of the case situations in the array. The reason to have deterministic cases is so that every case in the array is distinguishable from every other case in the array. Case situations should not overlap. A single case action token should not be the result for two different situations.

Further action is required, however, if the received situation parameters resolve to more than one action token. In the present embodiment, a new case will be generated. Further action is also required if received data overlaps with existing case situations thereby causing the received situation parameters to resolve to an action token already associated with another situation. Again, in this embodiment, a new case is generated; however, this is not the only solution, as described herein.

As discussed below, when higher levels generate new cases, the new cases are fed-back through each level of the UAV system to ensure that the lower-levels "learn" the new situational expectations for elevating cases. Similarly, each device re-feeds new cases that the particular device, itself, generates so that the device can update the device's case base array. The fed-back cases are treated as received situation parameters at each level, and therefore behave in the same manner as any other received situation parameters.

A user may elect to only re-feed cases at the highest levels, or at UAV levels. Alternatively, a user may elect to only re-feed new cases from the highest-level to the UAV. Any permutation is available. In this embodiment, each UAV, second-level computing device 320, 322, and third-level computing device 330, re-feeds any new cases to itself and then to the devices falling underneath the device's direct hierarchy.

Next, if the UAV processor determines that the received situation parameters are deterministic, then UAV processor will again compare the received situation parameters against the UAV's local array of cases. In this comparison, the processor will determine which case in the array is the "best-matching case." That is, the processor determines which case in the array has a set of situation parameters that most-closely encompasses the received situation parameters. Here, the UAV processor calculates a possibility of being match by the situation parameters. This calculated possibility is also indicative of the possibility that the information is relevant to the upstream commander. In this embodiment, the processor calculates the possibility according to Equation 1, as shown previously. A person having ordinary skill in the art will appreciate that other formulae can be employed. The best-matching case is the case with the highest-calculated possibility after applying Equation 1.

The UAV processor next performs an error-check on the best-matching case. Erroneously outputted best-matching cases are corrected using learning feedback. Whenever it is determined that the system outputs, at any level, are erroneous or less than a perfect decision, feedback learning occurs to assign correct cases the necessary devices. Again, similar to the events if a non-deterministic case is found, if an error occurs then the received situation parameters are sent to the new case generator at the given level, and the processor is stopped or ceased.

If the best-matching case is not an error, then the UAV processor will determine whether the UAV best-matching case satisfies a UAV "squelch" threshold. This is a minimum requirement possibility that a best-matching case must satisfy. In this embodiment, the UAV's squelch threshold is initially set to 0.5, since the probability scale is set between 0 (no possibility) and 1 (absolute). Thus, if a sensor gathers data that resolves to a situation-action token pair having a calculated possibility of 0.4, and this situation-action token pair is determined to be the best-matching case in the UAV's array of case, then the resolved best-matching case is "squelched."

Squelching occurs in all devices, including devices residing at levels above the UAV and other UAVs. If the best-matching case does not satisfy a device's squelch threshold, then the received situation parameters are sent to the device's new case generator, and the device's processor is ceased.

However, if the UAV's best-matching case does satisfy the squelch threshold, then the UAV processor outputs the UAV best-matching case into a buffer memory remotely accessible to devices in the system. In this embodiment, the UAV's buffer memory is found on the second-level device to which the UAV is hierarchically assigned. However, an ordinary artisan would appreciate that this buffer memory could also be found locally on the UAV, or on a centralized device accessible to other system devices.

In the event that generating new case is necessary, the UAV has a localized processor for generating a new case. This "new case generator" is capable of receiving the situation parameters that fail the checks of the UAV's processor, and then generating a new case with a new situation action-token pair. This new case is then placed into the UAV's array of cases. Devices residing at each level have a similar new case generator.

To generate a new case, a UAV's new case generator receives the received situation parameters from the UAV processor that fail the UAV processor's checks. The idea here is to overwrite, or more granularly distinguish, the cases in the array, thereby learning variations of situations. This also permits the higher-levels to have a more contextual understanding of the received parameters.

The new case generator determines a new case, which naturally has its own situation and action token. The new situation is the received situation parameters. The new action token is one of either an existing action token already in the array of cases, which corresponds to the received situation parameters, or alternatively, the new action token is the action token of a fed-back case.

In some embodiments, such as the present one, the new case generator can then compare the new situation-action token pair against the array of cases to determine whether the new situation-action token pair is a non-deterministic case. If the new situation-action token pair is a non-deterministic case, then the new case generator will overwrite the situation of whatever conflicting cases are in the array, with the situation of the new case's situation.

For efficient memory management, the new case generator can be configured to expunge the least-recently triggered case from the array of cases. Then, the new case can be placed in the logical-head of the array of cases for more efficient access.

After instituting the new case, the new case is then sent back to the device's processor as a fed-back case, thereby permitting learning at the local device, and then sending forward the most recent and relevant situational information. This new case is then also output to the relevant devices as a fed-back case, thereby allowing for system-wide learning within the hierarchical structure.

The UAV system 300 of the present embodiment is a three-tiered hierarchical system. In this embodiment there can be one or more second-level computers 320, 322 and third-level computer(s) 330. The second-level computers 320, 322 are hierarchically "above" one or more UAVs 305, 305'. Any particular second-level computer has one or more UAVs that report to the second-level computer.

The second-level computers are configured much the same as the UAVs. The second-level computers concatenate the received UAV outputted action tokens, which are stored on a local buffer memory. The second-level processor performs similar calculations and determinations as that of the UAV processors. When necessary, the second-level new case generator also performs the same tasks of generating new cases for the second-level array, and re-feeding the new cases to the UAVs reporting to the second-level computer.

In this embodiment, the second-level computer attaches a "mission requirements token" to the second-level best-matching cases, which are then output to another buffer memory to await third-level retrieval. The mission requirements token is a symbolic value, which the third-level processor will use to calculate third-level best-matching case. The third-level device retrieves this second-level output from the buffer memory as "third-level situation parameters."

In this embodiment, there is a third-level computer, which is hierarchically above one or more second-level computers. Like the second-level computer, the third-level can concatenate the best-matching cases of the second-level best-matching case. It is possible, however, for the third level to processor to calculate the best-matching case before fusing together the outputted action tokens from the second-level.

In this embodiment, the second-level outputs a stream of tokens, i.e., the action tokens of the best-matching case and the mission requirements tokens. The third-level processor behaves similarly to that of the second-level processor, e.g., checking for non-deterministic cases or checking for errors. The third-level new case generator also behaves similarly to the second-level new case generator, e.g., acquiring new cases at the logical head of the array, or expunging the least recently triggered cases from the logical tail of the array. There are some differences, however.

The third-level processor calculates the best-matching case from the third-level array based-upon Equation 4, which differs from Equation 1. In Equation 4, when the third-level processor calculates a case's possibility, it will check whether the mission requirements value, found in the attached mission requirements token, is inside of the case's situation. In other words, the third-level processor determines whether the mission requirements value is an element of the set of the case's situational parameters. If so, then the mission requirements value is a valid value in the context of the situation. If, however, the mission requirements value is outside of the case's situation parameters, then the case is assigned a possibility of zero.

Again, the third-level new case generator can send new cases back to itself, and to devices that are underneath the third-level device's hierarchy.

In the UAV system 300, the UAV's sensor data could be strictly numeric, symbolic, or a mixed-mode. In some embodiments, the UAVs 305, 305' could have convertors that convert data into symbolic data. Here, the converter compares received situation parameters against the UAV array of cases to determine which case in the array corresponds to the action token on the UAV array of cases. Similar to other issues regarding non-deterministic cases, the converter will then determine whether the corresponding action token is also simultaneously associated with some other an overlapping situation of an overlapping situation-action token pair.

If such an overlap arises, then the received situation parameters and the overlapping situation are "fused" into a single parameter range, which is now associated with the action token. This newly formed fused range is now treated as the received situation parameters originally received from the UAV's sensor 310, 312.

Alternatively, the symbolic converter of this embodiment can also determine whether the received situation parameters and the overlapping situation, are associated with different action tokens. That is, the two parameter ranges, which overlap in some way, resolve to two different action tokens, constituting another example of non-deterministic cases. In this event, the ranges are "split," such that the overlapping situation is abridged. The received situation parameters overwrites the portion of the overlapping situation in the UAV array of cases, thereby allowing for the received parameters to resolve to one action token, and the formerly overlapping case to resolve to a different action token, but now there are distinct boundaries between to two parameters.

Sometimes, however, it may be beneficial to not immediately split the ranges. In some scenarios, received situation parameters are a unique "singularity," which should not be permanently learned by the UAV's array of cases. When received situation parameters are considered a singularity case, the singularity case is stored temporarily. Also, the parameter range may, or may not, be split, depending on the type of sensor data. The singularity case is assigned its own case in the array of cases when an identical case is received. In other words, the overlapping case situations are overwritten by the singularity case. Likewise, the parameter range boundaries of the array of cases is split as necessary.

The devices in a UAV system (such as the one in FIG. 3) can be configured to efficiently manage the "length" of situation parameters, such that the situation parameters are not too long or too short. The UAV situation parameters will have an expected precision length. Similarly, the second-level situation parameters have a precision length, and the third-level situation parameters have precision length.

The length is determined by how many non-deterministic cases are found within a certain period of time. Increasing the length decreases the likelihood of a deterministic overwrite. Decreasing the length increases the likelihood of a deterministic overwrite. The times periods are set long enough to minimize the chance of producing erroneous action tokens and short enough to enable the system to operate fast enough and within available memory constraints.

In this embodiment, each device's processor can increase the precision lengths for all subsequently received parameters when a non-deterministic case is discovered within a "parameter-sensitizing check period." Likewise, each device's processor can decrease the precision lengths for subsequently received parameters when a non-deterministic case is discovered within a parameter-desensitizing check period.

In this embodiment, each device's processor can adjust the squelch threshold of the device's processor. The squelch threshold is increased, thereby narrowing the precision required to satisfy the device's squelch threshold, when a best-matching case is squelched. For example, whenever an incorrect action is produced at the third, or highest level, the squelches are raised according to Equation 2. Likewise, the squelch threshold is decreased, thereby relaxing or forgiving the squelch requirements, when the best-matching case is incorrectly below the respective squelch threshold. For example, whenever a correct but "squelched" action is produced at the third, or highest level, the squelches are reduced by Equation 3.

Other Embodiments

Embodiments of the subject matter can be utilized in other contexts as well; not only to fuse heterogeneous sensor data.

For example, one embodiment is a model or building block for a general intelligent system. In particular, it can underlie systems providing the inductive equations to reduce the burden of supervised training. For example, where the human in the loop need only provide random training and the equations will automatically provide the symmetric extensions. Such intelligent system designs do not require preprocessed sensor data. Rather, they can learn to extract salient features from binary data—converting it into usable sensor data.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed:

1. A method for updating automatic systematic responses based on sensor data, said method comprising the steps of:
   receiving sensor data obtained from two or more sensors;
   extracting a set of received situation parameters from said sensor data to create a new situation case;
   iteratively performing an algorithm to exclude non-deterministic case data, wherein said non-deterministic case data is data which is insufficient to further process said new situation case;
   iteratively performing a best-matching case function to determine a best-matching case for said new situation case by comparing data values of said new situation case to data values of known cases in an array of cases, wherein said array of cases includes pointers to known actions associated with said known cases and wherein said known cases and said known actions comprise a plurality of situation-action pairs;
   identifying a corresponding situation-action pair from said plurality of situation-action pairs which statistically represents said best-matching case for said new situation case;
   generating a best-action token to correspond to said corresponding situation-action pair;
   performing an algorithm to determine whether said best-action token has a threshold probability of accurate response;
   generating said best-action token to invoke a test function to perform an action if said threshold probability of accurate response is met or generating a new case-action pair which is stored in non-transitory buffer memory; and performing a squelching algorithm to determine if a threshold probability of accurate response is met by a situation-pair.

2. The method of claim 1, which further includes the step of adjusting user-defined parameters for said squelching algorithm.

3. The method of claim 1, which further includes the step of autonomously adjusting parameters for said squelching algorithm.

4. The method of claim 1, which further includes the step of suppressing said best-action token if said threshold probability for accurate response for said best-matching case is not met.

5. The method of claim 1, which includes the step of sending said best-matching case to said non-tranistory buffer memory based on the result of said squelching algorithm.

* * * * *